United States Patent
Pinney

(10) Patent No.: US 11,523,012 B1
(45) Date of Patent: Dec. 6, 2022

(54) METHOD AND SYSTEM FOR TRANSPARENTLY INJECTING CUSTOM SCREENS INTO EXISTING THIRD-PARTY WORKFLOWS

(71) Applicant: Konica Minolta Business Solutions U.S.A., Inc., Ramsey, NJ (US)

(72) Inventor: Shaun Pinney, Newark, CA (US)

(73) Assignee: KONICA MINOLTA BUSINESS SOLUTIONS U.S.A., INC., Ramsey, NJ (US)

( * ) Notice: Subject to any disclaimer, the term of this patent is extended or adjusted under 35 U.S.C. 154(b) by 0 days.

(21) Appl. No.: 17/491,206

(22) Filed: Sep. 30, 2021

(51) Int. Cl.
 *H04N 1/00* (2006.01)
 *H04N 1/44* (2006.01)

(52) U.S. Cl.
 CPC ......... *H04N 1/00411* (2013.01); *H04N 1/442* (2013.01); *H04N 1/4413* (2013.01); *H04N 2201/0094* (2013.01)

(58) Field of Classification Search
 CPC ... H04N 1/00411; H04N 1/4413; H04N 1/442
 USPC ...................................................... 358/1.14
 See application file for complete search history.

(56) References Cited

U.S. PATENT DOCUMENTS

| | | | |
|---|---|---|---|
| 10,148,644 B2 * | 12/2018 | Hosoda | H04L 63/083 |
| 2005/0276519 A1 * | 12/2005 | Kitora | G06V 30/414 |
| | | | 382/305 |
| 2016/0182762 A1 * | 6/2016 | Eum | H04N 1/00307 |
| | | | 358/1.14 |
| 2021/0176059 A1 * | 6/2021 | Hertrich | H04L 9/3271 |

* cited by examiner

*Primary Examiner* — Allen H Nguyen
(74) *Attorney, Agent, or Firm* — Buchanan Ingersoll & Rooney PC

(57) ABSTRACT

A method, a non-transitory computer readable medium, and multifunction printer are disclosed for injecting screens into a third-party workflow on a display panel of a multifunction printer. The method includes displaying, on the display panel of the multifunction printer, a first screen from a third-party workflow; detecting, on the multifunction printer, a first authentication attempt from a user; inserting, on the display panel of the multifunction printer, a first screen from an authentication workflow into the third-party workflow upon the detection of the first authentication attempt from the user; sending, from the multifunction printer, authentication data associated with the first authentication attempt to an authentication server; receiving, from the authentication server, an authentication result associated with the first authentication attempt; and displaying, on the display panel of the multifunction printer, a second screen from the third-party workflow following a successful authentication result from the authentication server.

20 Claims, 7 Drawing Sheets

METHOD AND SYSTEM FOR TRANSPARENTLY INJECTING CUSTOM SCREENS INTO EXISTING THIRD-PARTY WORKFLOWS

FIELD OF THE DISCLOSURE

The present disclosure relates to a method and system for transparently injecting custom screen into existing third-party workflows, and more particularly, a method and system, which supports adding additional security features to third-party authentication workflows by transparently injecting additional custom screens into existing third-party workflows without requiring modifications to third-party software and/or workflows.

BACKGROUND

Authentication methods, for example, for biometric authentication on a multifunction printer (MFP), can require authentication specific screens on the multifunction printer panel once the user attempts biometric authentication to unlock the multifunction printer (for example, a user touches their finger to a fingerprint reader). The authentication specific screens after the authentication process is started can include, for example, a "Please Wait" graphic while the multifunction printer communicates with the authentication server. In addition, the authentication may prompt known users for additional authentication, for example, a personal identification number (PIN) for two-factor authentication (2FA) or multi-factor authentication (MFA). In addition, the authentication screens can prompt unknown users to register their fingerprint with the authentication server. Additional authentication-specific screens and features can be displayed as well.

One challenge in providing the above feature is that multifunction printers can allow third-party applications to control the multifunction printer panel. For example, third-party products like PaperCut, Kofax Equitrac, Pharos BluePrint, and others, can use the multifunction printer's SDK framework for third-party vendors to control the multifunction printer panel display and show third-party screens in some sequence defined by the third party.

For example, if a third-party application supports username and password authentication, the first third-party screen may prompt the user to login by username or password and, after entering a valid username and password, then the next third-party screen may show the user's remaining cash balance before proceeding to the user's home page. However, if the MFP supports a biometric authentication or additional security feature, and the third-party application does not, then another scenario arises. When the first third-party screen is displayed and the user starts biometric authentication, the MFP may instead want to display an authentication screen prompting unknown users to register with an authentication server or authentication manager (e.g. register fingerprint) or prompt for PIN after a known user is detected. After a successful registration or authentication, it would be desirable to return to the third party workflow and resume the third-party screens (e.g. show a remaining balance for a user). However, since the third-party application or workflow does not know of authentication screens that are available during user authentication, the third-party application or workflow is unable to transition to the authentication screens without modification by the third party. In this scenario, it is desirable to provide a way for the MFP to inject additional screens into the third-party login workflows and return back to third-party workflows when complete. With such a feature, it is possible for MFP vendors to add new security features to existing third-party workflows in a way that does not require modifications to third-party applications, thereby speeding time-to-market and making sure the new MFP security features, such as biometric authentication and 2FA/MFA, are available for all third-party MFP applications.

SUMMARY

In accordance with an exemplary embodiment, to avoid modification of third-party applications, it would be desirable to have a method and system, which is transparent and does not require third-party customization to support additional authentication screens. For example, it would be desirable to have a method and system for transparently injecting authentication screens into third-party screen workflows and resume the third party screens and workflow once the authentication screens are completed.

In accordance with an aspect, a method for injecting screens into a third-party workflow on a display panel of a multifunction printer, the method comprising: displaying, on the display panel of the multifunction printer, a first screen from a third-party workflow; detecting, on the multifunction printer, a first authentication attempt from a user; inserting, on the display panel of the multifunction printer, a first screen from an authentication workflow into the third-party workflow upon the detection of the first authentication attempt from the user; sending, from the multifunction printer, authentication data associated with the first authentication attempt to an authentication server; receiving, from the authentication server, an authentication result associated with the first authentication attempt; and displaying, on the display panel of the multifunction printer, a second screen from the third-party workflow following a successful authentication result from the authentication server of the first authentication attempt from the user.

In accordance with another aspect, a non-transitory computer readable medium (CRM) storing computer program code executed by a computer processor that performs a process for injecting screens into a third-party workflow on a display panel of a multifunction printer, the processing comprising: displaying, on the display panel of the multifunction printer, a first screen from a third-party workflow; detecting, on the multifunction printer, a first authentication attempt from a user; inserting, on the display panel of the multifunction printer, a first screen from an authentication workflow into the third-party workflow upon the detection of the first authentication attempt from the user; sending, from the multifunction printer, authentication data associated with the first authentication attempt to an authentication server; receiving, from the authentication server, an authentication result associated with the first authentication attempt; and displaying, on the display panel of the multifunction printer, a second screen from the third-party workflow following a successful authentication result from the authentication server of the first authentication attempt from the user.

In accordance with another aspect, a multifunction printer comprising: a display panel; and a processor, the processor configured to inject screens into a third-party workflow on the display panel of the multifunction printer by: displaying, on the display panel of the multifunction printer, a first screen from a third-party workflow; detecting, on the multifunction printer, a first authentication attempt from a user; inserting, on the display panel of the multifunction printer, a first screen from an authentication workflow into the third-party workflow upon the detection of the first authentication attempt from the user; sending, from the multifunction printer, authentication data associated with the first authentication attempt to an authentication server; receiving, from the authentication server, an authentication result associated with the first authentication attempt; and displaying, on the display panel of the multifunction printer, a second screen from the third-party workflow following a successful authentication result from the authentication server of the first authentication attempt from the user.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
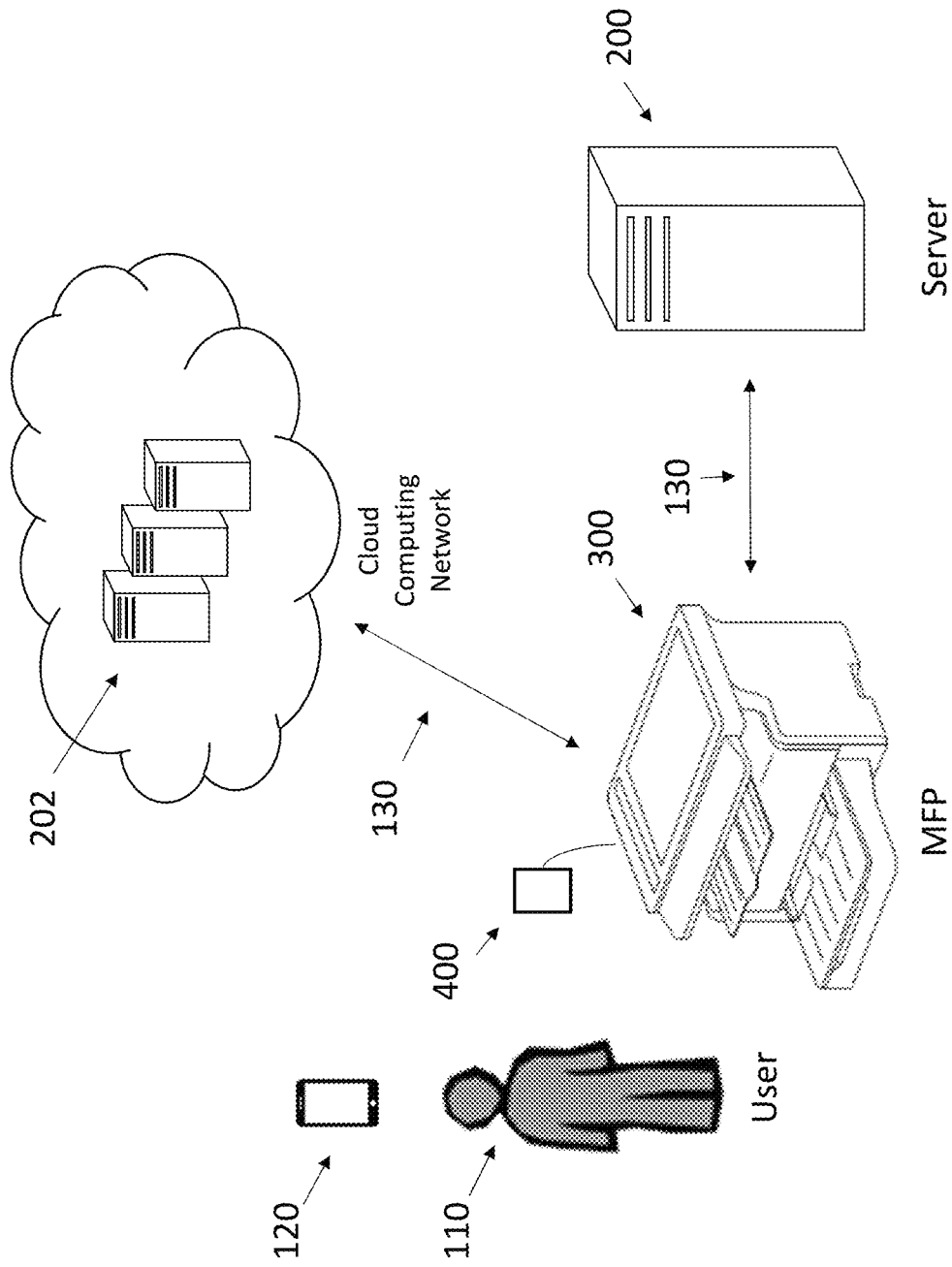
FIG. 1 is an illustration of a system for transparently injecting custom screens into existing third-party workflows on a multifunction printer (MFP) in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, it would be desirable to have a method and system that allows vendors of multifunction printers to enhance third-party authentication workflows to add additional security features transparently meaning without requiring any changes to existing third-party applications. In accordance with an exemplary embodiment, the method and system as disclosed herein can allows the vendors of multifunction printers the flexibility to meet security and market requirements faster and to keep pace with changes to the security and competitive landscape.

For example, not all third-party vendor applications support authentication, for example, via an external biometric device. Accordingly, it would be desirable, to have a method and system for use with an external biometric device and an authentication management service, which includes a transparent screen switching feature that supports and displays one or more biometric-specific screens and messages to users of a multifunction printer having a third-party application that does not have biometric screens or messages.

In accordance with an exemplary embodiment, an authentication management switcher can be added, which is configured to take screen control from third-party applications and return control to the third-party application after the authentication process has been completed. The authentication management switcher can be triggered to take screen control in response to, for example, biometric authentication attempts by a user and/or one or more other triggering events. In accordance with an exemplary embodiment, the authentication management switcher can also be configured to return control to the third-party application when the authentication of the user has been completed, and further allows, for example, resumption of the third-party screen workflows.

In accordance with an exemplary embodiment, the authentication management switch can be part of the multifunction printer firmware, which is capable of switching the multifunction printer video output between the application programming interface (API) screens and the authentication management screens at the appropriate time as determined by predefined trigger events, for example, upon starting biometric authentication. For example, the predefined trigger events can be related to security related screens instead of biometric authentication.

FIG. 1 is an illustration of a system 100 for transparently injecting custom screens into existing third-party workflows in accordance with an exemplary embodiment. As shown in FIG. 1, the system 100 can includes one or more servers 200, 202, which can be configured to host, for example, an authentication management service or application with method and system as disclosed for transparently injection custom screens into third-party workflows. The system 100 can also include a user 110, a client 120, a multifunction printer 300, and an authentication device 400. In accordance with an exemplary embodiment, the user 110 can be authenticated via the authentication device 400, which can be, for example, an external biometric device before accessing the multifunction printer 300. The system can also include the client 120, for example, a mobile client configured to send resources to the multifunction printer 300 and/or as an authentication device, for example, for two-factor authentication. For example, the client 120 can be used to receive an input code, for example, a series of numbers upon authentication of the user 110 with the authentication device 400.

The client 120, the one or more servers 200, 202, the multifunction printer 300, the authentication device 400, can be configured to communicate with one another via a communication network or network 130. The communication network or network 130 can be a public telecommunication line and/or a network (for example, LAN or WAN). Examples of the communication network 130 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission. In accordance with an exemplary embodiment, the multifunction printer 300 and the authentication device 400 can be connected with a wire or wireless.

Figure 2:
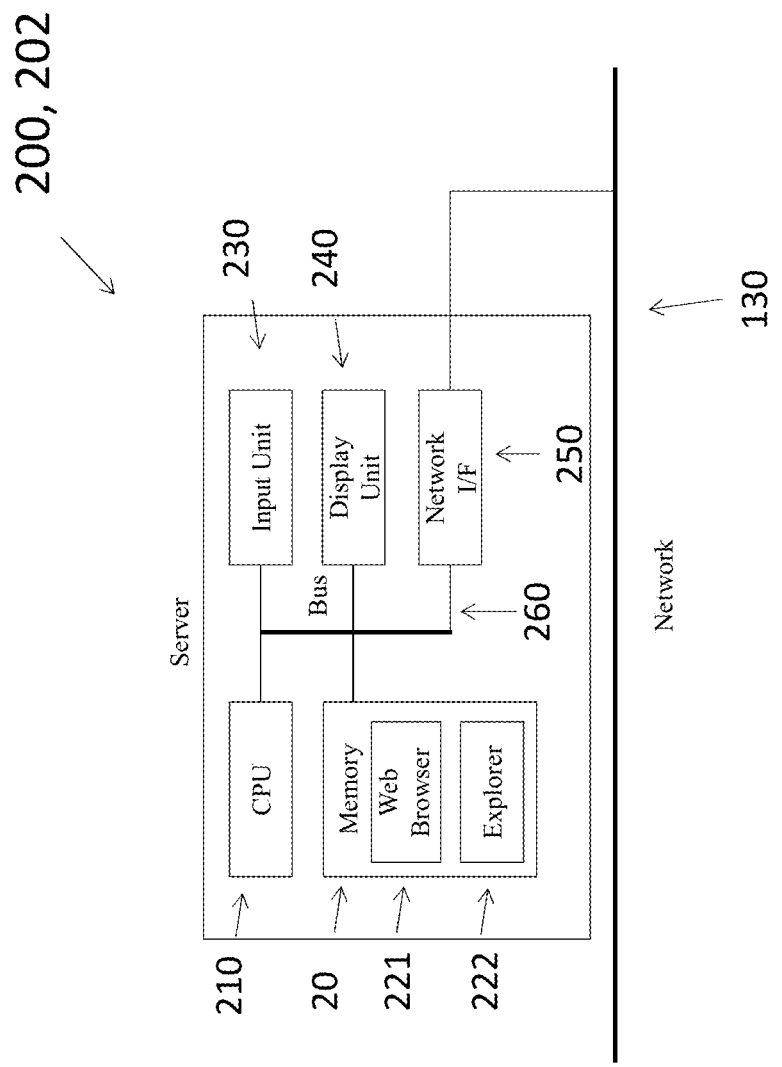
FIG. 2 is an illustration of a server for transparently injecting custom screens into existing third-party workflows in accordance with an exemplary embodiment.

FIG. 2 is an illustration of a server 200, 202, in accordance with an exemplary embodiment. As shown in FIG. 2, the server 200, 202 can be configured to provide applications and/or services to the multifunction printer 300 and the authentication device 400 via the multifunction printer 300. In addition, for example, one or more of the servers 200, 202, for example, can be a plurality of servers 202 deployed in the cloud providing cloud infrastructure and cloud storage. The server 200, 202 can include a processor or central processing unit (CPU) 210, and one or more memories 220 for storing software programs and data. The processor or CPU 220 is configured to carry out the instructions of a computer program, which operates and/or controls at least a portion of the functionality of the server 200, 202. The server 200, 202 can also include an input unit 230, a display unit or graphical user interface (GUI) 240, and a network interface (I/F) 250, which is connected to a communication network (or network) 130. A bus 260 can connect the various components 210, 220, 230, 240, and 250 within the server 200, 202. The server 200, 202 can include an operating system (OS), which manages the computer hardware and provides common services for efficient execution of various software programs as disclosed herein.

Figure 3:
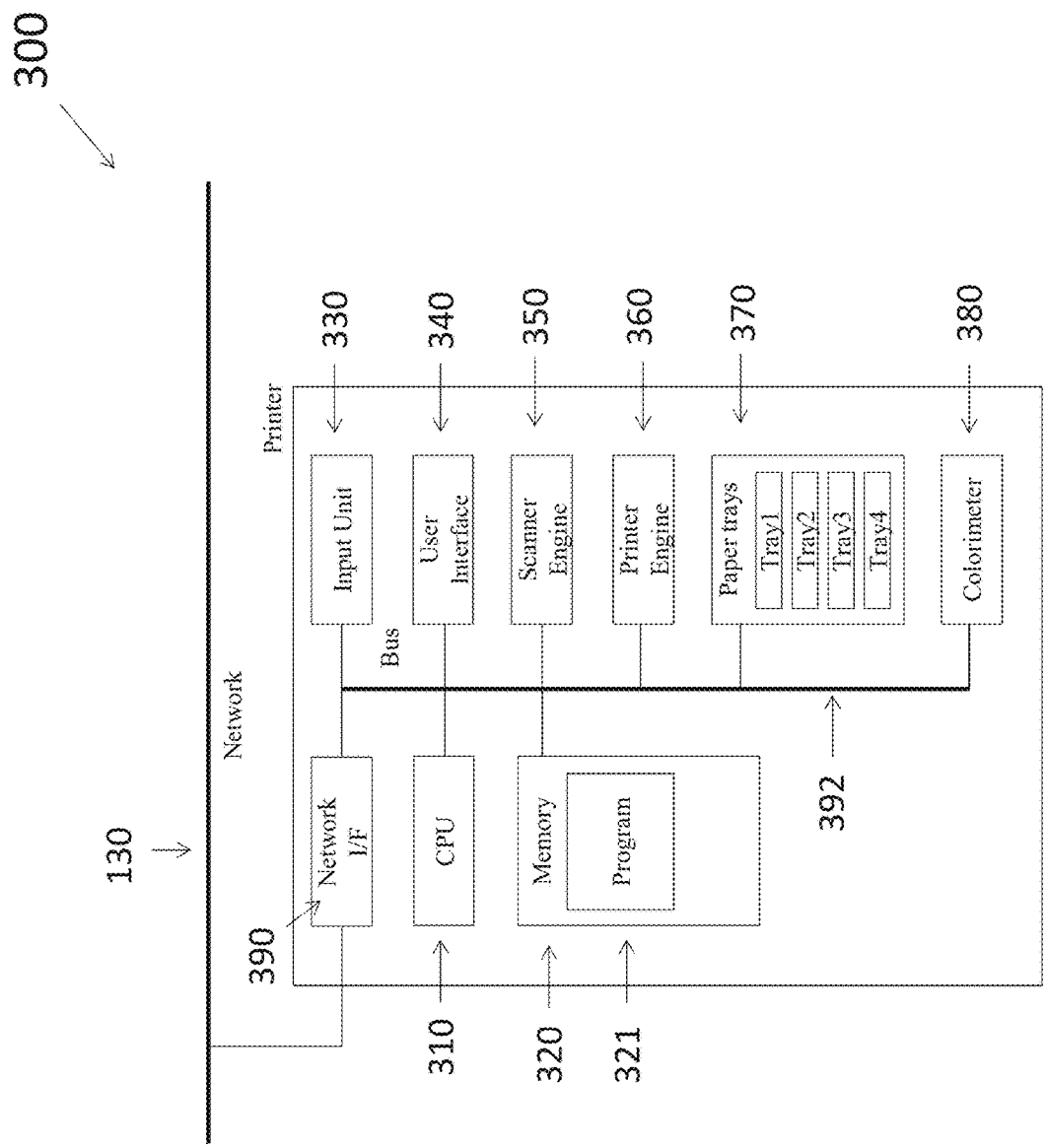
FIG. 3 is an illustration of a multifunction printer in accordance with an exemplary embodiment.

FIG. 3 is an illustration of a multifunction printer (MFP) 300 in accordance with an exemplary embodiment. As shown in FIG. 3, the multifunction printer 300 (i.e., a printer or printing device) can include a network interface (I/F) 390, which is connected to the communication network (or network) 130, a processor or central processing unit (CPU) 310, and one or more memories 320 for storing software programs, for example, firmware for the multifunction printer and data (such as files to be printed) 321. For example, the software programs 321 can include a printer controller and a tray table. The processor or CPU 310 carries out the instructions of a computer program, which operates and/or controls at least a portion of the functionality of the MFP 30. The MFP 30 can also include an input unit 330, a user interface or graphical user interface (GUI) 340 (i.e., display unit or user interface screen), a scanner engine (or scanner) 350, a printer engine 360, a plurality of paper trays 370, and a colorimeter 380. In accordance with an exemplary embodiment, the user interface 340 may include high-definition multimedia interface (HDMI), digital visual interface (DVI), video graphics array (VGA), etc. The display user interface 340 may be any suitable type of display for displaying data including a cathode ray tube (CRT) display, liquid crystal display (LCD), light-emitting diode (LED) display, capacitive touch display, thin-film transistor (TFT) display, etc.

In accordance with an exemplary embodiment, the colorimeter 380 can be an inline colorimeter (ICCU) (or spectrophotometer), which measures printed color patches in order to generate color profiles. In accordance with an exemplary embodiment, for example, the colorimeter (or spectrophotometer) 380 can be one or more color sensors or colorimeters, such as a RGB scanner, a spectral scanner with a photo detector or other such sensing device known in the art, which can be embedded in the printed paper path, and an optional finishing apparatus or device (not shown). A bus 392 can connect the various components 310, 320, 330, 340, 350, 360, 370, 380, and 390 within the multifunction printer 300. The multifunction printer 300 also includes an operating system (OS), which manages the computer hardware and provides common services for efficient execution of various software programs. In accordance with an exemplary embodiment, it can be within the scope of the disclosure for the multifunction printer 300 to be a copier.

For example, in accordance with an exemplary embodiment, an image processing section within the multifunction printer 300 can carry out various image processing under the control of a print controller or CPU 310, and sends the processed print image data to the print engine 360. The image processing section can also include a scanner section (scanner engine 350) for optically reading a document, such as an image recognition system. The scanner section receives the image from the scanner engine 350 and converts the image into a digital image. The print engine 360 forms an image on a print media (or recording sheet) based on the image data sent from the image processing section. The central processing unit (CPU) (or processor) 310 and the memory 320 can include a program for RIP processing (Raster Image Processing), which is a process for converting print data included in a print job into Raster Image data to be used in the printer or print engine 360. The CPU 310 can include a printer controller configured to process the data and job information received, for example, received via the network connection unit and/or input/output section (I/O section) 390.

The CPU 310 can also include an operating system (OS), which acts as an intermediary between the software programs and hardware components within the multifunction printer. The operating system (OS) manages the computer hardware and provides common services for efficient execution of various software applications. In accordance with an exemplary embodiment, the printer controller can process the data and job information received, for example, from a client 44 to generate a print image.

In accordance with an exemplary embodiment, the network I/F 390 performs data transfer with, for example, the one or more servers 200, 202 and/or the client device 120. The printer controller can be programmed to process data and control various other components of the multifunction printer to carry out the various methods described herein. In accordance with an exemplary embodiment, the operation of printer section commences when the printer section receives a page description from the client device 120 via the network I/F 390 in the form of a print job data stream and/or fax data stream. The page description may be any kind of page description languages (PDLs), such as PostScript® (PS), Printer Control Language (PCL), Portable Document Format (PDF), and/or XML Paper Specification (XPS). Examples of a multifunction printer 300 consistent with exemplary embodiments of the disclosure include, but are not limited to, a multifunction printer (MFP), a laser beam printer (LBP), an LED printer, a multifunction laser beam printer including copy function.

In accordance with an exemplary embodiment, the multifunction printer 300 can also include at least one auto tray or paper tray 370, and more preferably a plurality of auto trays or paper trays. Each auto tray or paper tray 370 can include a bin or tray, which holds a stack of a print media (not shown), for example, a paper or a paper-like product. The printer engine or print engine 360 has access to a print media of various sizes and workflow for a print job, which can be, for example, stored in the input tray. A "print job" or "document" can be a set of related sheets, usually one or more collated copy sets copied from a set of original print job sheets or electronic document page images, from a particular user, or otherwise related.

In accordance with an exemplary embodiment, the print media is preferably a paper or paper-like media having one or more print media attributes. The print media attributes can include, for example, paper color, coating, grain direction, printing technology, brightness, CIE, tint, whiteness, lab-Color, etc. In order to maximize print quality, the print media attributes of each type of print media should be input into or hosted on the multifunction printer 300, for example, on printer configuration settings of the multifunction printer 300 to obtain the highest quality output. Most print media is provided in reams or other known quantities, which are packaged with indicia such as information on the manufacture, size, type and other attributes of the print media. In addition, most bundles or reams of paper include a UPC (Universal Product Code) or bar code, which identifies the type of print media including manufacture of the print media.

Figure 4:
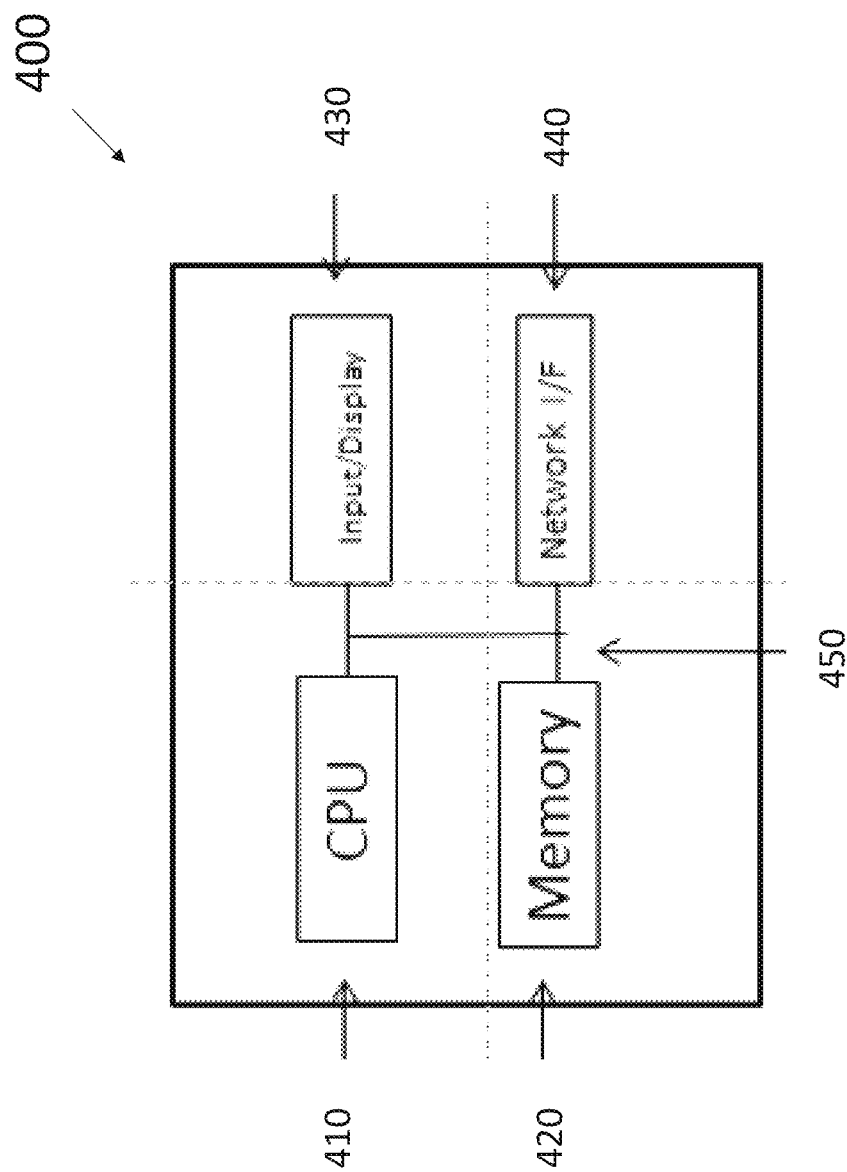
FIG. 4 is an illustration of an external biometric device in accordance with an exemplary embodiment.

FIG. 4 is an illustration of an exemplary biometric device 400 in accordance with an exemplary embodiment. In accordance with an exemplary embodiment, the exemplary biometric device 400 is a security identification and authentication device, which uses automated methods of verifying or recognizing the identity of a living person based on a physiological or behavioral characteristic. Thus, the user need not to manually input passwords to the multifunction printer. The method of recognizing the user can include, for example, fingerprints, electrocardiogram (ECG or EKG) information, facial images, iris, and voice recognition. For example, in accordance with an exemplary embodiment, the biometric device 400 can be an external biometric device 400 that includes an interface, for example, an input/display 430 configured to detect a fingerprint of a user 110. Alternatively, the biometric device 400 can be wearable device, for example, a Nymi™ band, which detection of the user is based on the electrocardiogram (ECG) and its unique properties, i.e., electrical activity of the heartbeat of the wearer.

As shown in FIG. 4, the biometric device 400 can include a processor or central processing unit (CPU) 410, and one or more memories 420 for storing software programs and data, for example, an operating system. In accordance with an exemplary embodiment, the processor or CPU 410 carries out the instructions of a computer program, which operates and/or controls at least a portion of the functionality of the biometric device 400. The biometric device 400 can also include the input unit and/or display unit or graphical user interface (GUI) 430, and a network interface (I/F) 440, which is configured to connect the biometric device 400 to the MFP 300 via, for example, a wire or wireless technology, for example, Bluetooth. A bus 450 can connect the various components 410, 420, 430, 440, within the biometric device 400.

In accordance with an exemplary embodiment, the biometric device 400 of the user 110 may communicate with the client 120, for example, a mobile client, tablet, or personal computer, when Bluetooth or Near Field Communication (NFC) or other protocols are available to transfer and/or receive the biometric data, access codes and/or temporary codes as disclosed herein. For example, the client 120 may include a display unit or graphical user interface, which can access, for example, a web browser in the memory of the mobile client (or mobile device). The mobile client (or mobile device) also includes the operating system (OS), which manages the computer hardware and provides common services for efficient execution of various software programs.

Figure 5:
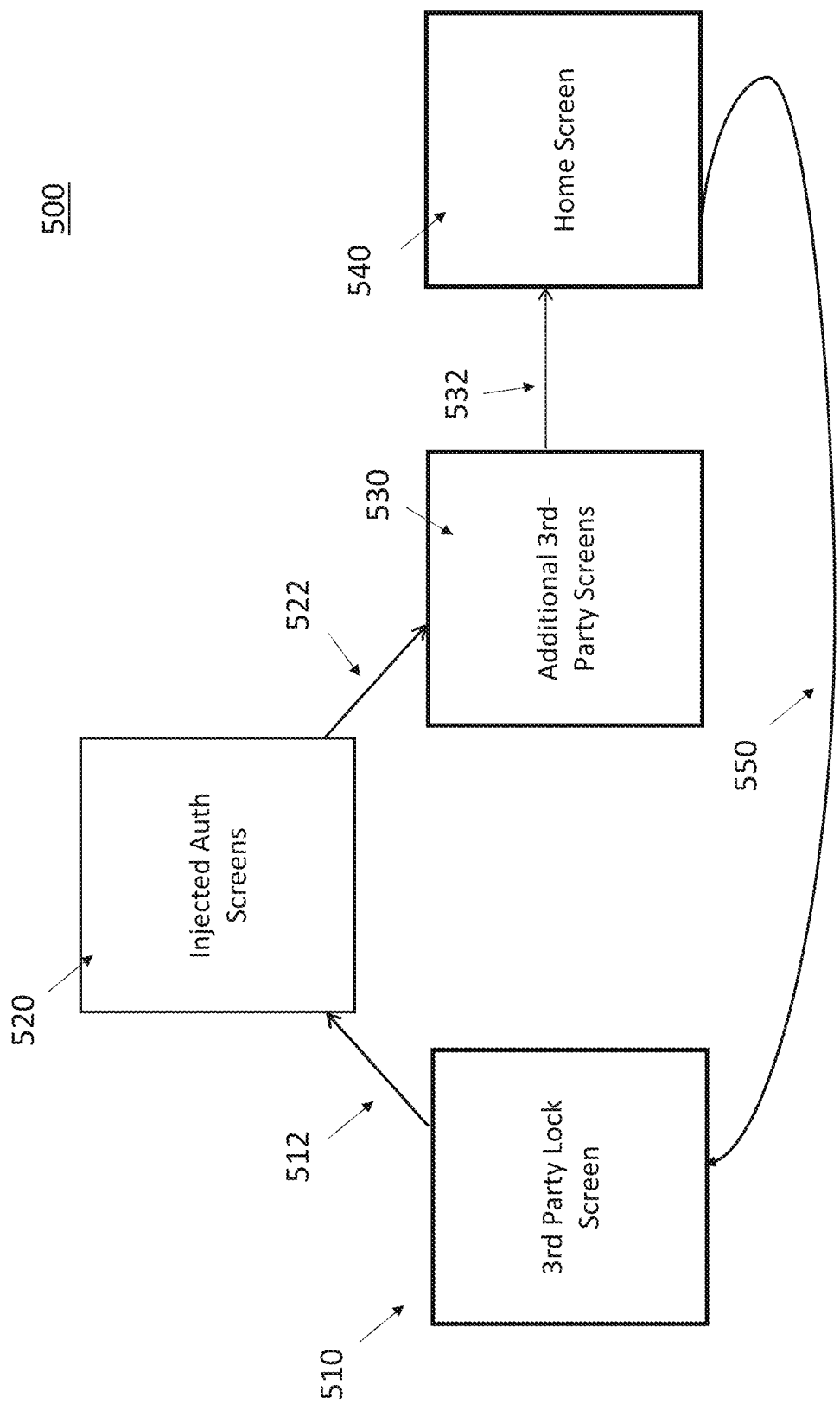
FIG. 5 is an exemplary embodiment of a method for transparently injecting custom screens into third-party workflows.

FIG. 5 is an exemplary embodiment of a method 500 for transparently injecting custom screens into third-party workflows. As shown in FIG. 5, in step 510, a third-party lock screen can be displayed to a user 110 on the user interface 340 of the multifunction printer 300. For example, the user 110 may be presented with "please start biometric authentication". In accordance with an exemplary embodiment, the user 110 is not known and/or authentication at this point. In response to the request by the multifunction printer 300 for authentication, the user 110 can start the authentication process, for example, biometric authentication using an authentication device 400, for example, an external biometric device that detects fingerprints of the user. The user 110 can start the biometric authentication by touching one or more fingers to the fingerprint reader of the biometric device 400. As shown, in step 512, the screen control is transferred from the third-party to the authentication management application or service, which can be hosted on one or more of the servers 200, 202. In step 520, the authentication management service injects an authentication management screen into third-party application, which can be displayed on the user 110 interface 340 of the multifunction printer 300. For example, the user interface 340 can indicated that the user 110 is not found, and instruct the user 110 to register fingerprint. Alternatively, if the user 110 is known, the authentication management service can verify that the user 110 is authenticated and the authentication management service in step 522 can return the user interface back to the third-party screens, which are displayed in step 530.

In accordance with an exemplary embodiment, upon returning the user interface of the multifunction printer 300 back to the third-party screens, the user 110 is known and has been authenticated at this point. In addition, for example, upon returning the user interface of the multifunction printer 300 can display, for example, an additional third-party screens before, for example, an available account balance for the user 110 before presenting a login screen or similar screen. Once login has been completed by the user 110, for example, inputting a PIN or code from a two-factor authentication, control of the user interface can be switched to a user's home screen, which can be, for example, a display screen with Copy/Scan/etc. buttons). In step 540, the user's home screen can be displayed on the user interface of the multifunction printer 300. In step 550, logout can occur, which returns the process back to step 510.

Figure 6:
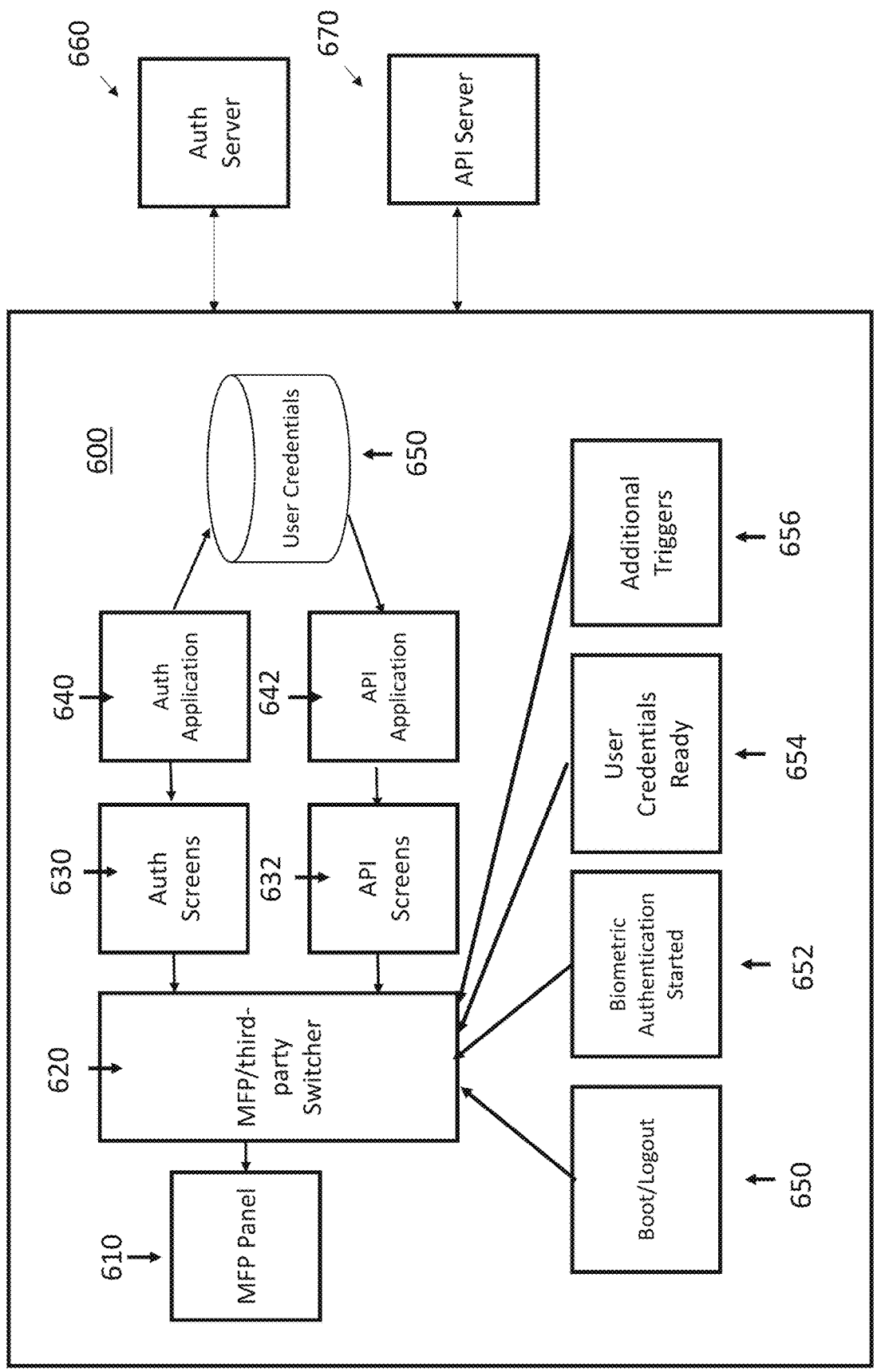
FIG. 6 is an exemplary block diagram of a multifunction printer, an authentication server, and an application programming interface (API) communication system server for transparently injecting custom screens into an existing third-party workflow in accordance with an exemplary embodiment.

FIG. 6 is an exemplary block diagram of a multifunction printer 600 for transparently injecting custom screens into an existing third-party workflow in accordance with an exemplary embodiment. The multifunction printer 600 can be in communication with an external authentication server 660 and/or an application programming interface (API) communication system server 670. In accordance with an exemplary embodiment, the application programming interface (API) communication system can be configured to execute a proprietary API communication system, for example, Konica Minolta's OpenAPI, which allows software application developers to create applications that communicate with Konica Minolta multifunction printers. In accordance with an exemplary embodiment, the API communication system and corresponding third-party applications can be developed using frameworks other than OpenAPI, for example, depending on the framework provided by the multifunctional printer vendor for third-party application development and software development kits.

In accordance with an exemplary embodiment, at boot, an API communication system application 642 is configured to pass a third-party workflow screen from an application programming screen database 632 to the multifunction printer panel 610. The user 110, for example, sees that the third-party workflow screen is a lock screen asking the user 110 to login. For example, login to the multifunction printer can be performed by entering username and password, card tap to a card reader, etc.

In accordance with an exemplary embodiment, the user 110 starts a biometric authentication (e.g. touches one or more fingers to a fingerprint reader supported by the authentication management server 660). In accordance with an exemplary embodiment, based on the touching of the fingerprint reader, the authentication management application 640 detects that biometric authentication has started, and selects a first authentication management screen 630, and signals biometric authentication started to the multifunction printer/third-party application framework switcher 620. The multifunction printer/third-party application framework switcher 620 detects that the biometric authentication of the user 110 has started and switches to sending the authentication management screens 630 to the multifunction printer panel 610. In accordance with an exemplary embodiment, the multifunction printer/third-party application framework switcher 620, the authentication management screens 630, and the authentication management application 640 is hosted on the firmware of the multifunction printer 600.

In accordance with an exemplary embodiment, the user 110, for example, sees an authentication management screen 630 indicating that authentication is in progress with the authentication management server 660. The authentication management application 640 sends the biometric authentication information to the authentication management server 660. The authentication management server 660 checks the biometric authentication information, returns a successful biometric authentication result, and can indicate, for example, that additional PIN authentication is needed, if the authentication process has two-factor authentication (2FA). The user 110 can then see an authentication management screen 630 prompting the user 110 to enter their authentication management PIN. The user 110 enters their authentication management PIN and clicks, for example, a "Next" button.

In accordance with an exemplary embodiment, the multifunction printer 600 sends the authentication management PIN to the authentication management server 660. The user 110 sees an authentication management screen 630 indicating that authentication is in progress with authentication management server 660. The authentication management server 660 checks the authentication management PIN, and if the authentication management PIN matches the authentication management PIN stored in the authentication management server 660, the authentication management server 600 can return a successful overall authentication result, and returns the user's credential information (e.g. API communication system login information). In accordance with an exemplary embodiment, the authentication management application 640 detects the user's credential information is available and notifies the multifunction printer/third-party application framework switcher 620 to return control to the API communication system screens 632. The multifunction printer/third-party application framework switcher 620 passes the API communication system screens 632 through to the multifunction printer panel 610.

In accordance with an exemplary embodiment, for example, the user 110 next sees the API communication system Lock Screen. The authentication management application 642 can supply the user's credential information to the API communication system application 642 (e.g., API communication system login information). The API communication system application 642 can use the user's credential information as needed to authenticate the user 110 and moves to the next screen in workflow (e.g. show user's account balance).

Figure 7:
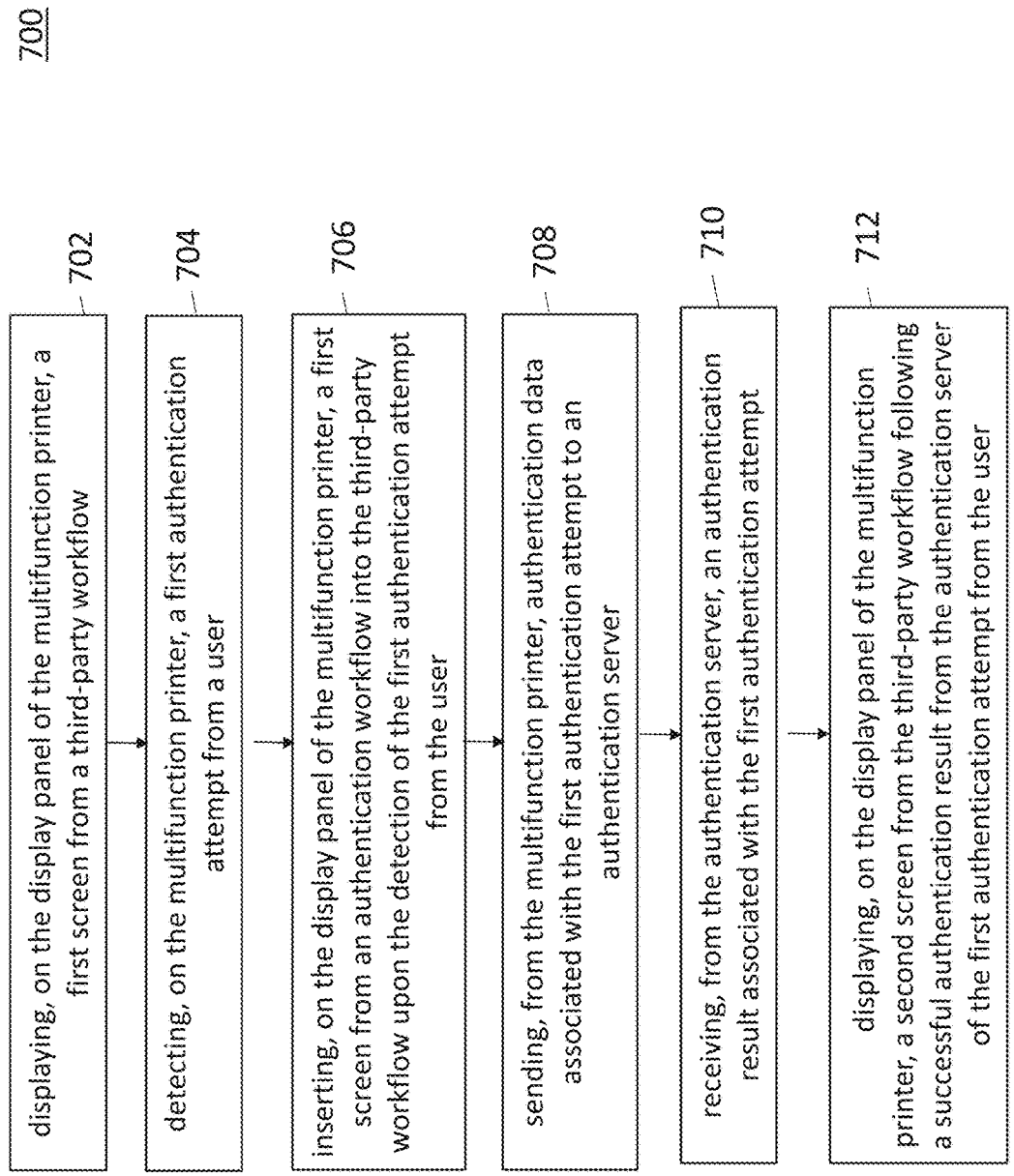
FIG. 7 is a flowchart illustrating a method for transparently injecting custom screens into existing third-party workflows on a multifunction printer in accordance with an exemplary embodiment.

In accordance with an exemplary embodiment, the multifunction printer 600 can also include a database of user credentials 650, for example, a database of user credentials for the API communication system. In addition, the multifunction printer 600 can include a boot/logout application 650, a biometric authentication started application 652, a user credentials ready application 654, and an additional trigger application 656. For example, the method and system has been described with use of a fingerprint reader, however, the method and system can be used with an biometric, for example, wearables, and other devices, FIG. 7 is a flowchart illustrating a method 700 for transparently injecting custom screens into existing third-party workflows on a multifunction printer in accordance with an exemplary embodiment. As shown in FIG. 7, in step 702, displaying, on the display panel of the multifunction printer, a first screen from a third-party workflow is displayed on the display panel of the multifunction printer. In step 704, a first authentication attempt from a user is detecting on the multifunction printer. In step 706, a first screen from an authentication workflow is inserted, on the display panel of the multifunction printer, into the third-party workflow upon the detection of the first authentication attempt from the user. In step 708, authentication data associated with the first authentication attempt is sent from the multifunction printer to an authentication server. In step 710, an authentication result associated with the first authentication attempt is received from the authentication server. In step 712, a second screen from the third-party workflow following a successful authentication result from the authentication server of the first authentication attempt from the user is displayed on the display panel of the multifunction printer.

In accordance with an exemplary embodiment, the method can further include displaying, on the display panel of the multifunction printer, one or more authentication screens with a request for one or more additional authentication attempts from the user upon a successful authentication of the first authentication attempt from user; sending, from the multifunction printer, authentication data associated with the one or more additional authentication attempts to the authentication server; and displaying, on the display panel of the multifunction printer, the second screen from the third-party workflow screen upon a successful authentication of the one or more additional authentication attempts from the user. The first authentication attempt can be a fingerprint of the user, and the one or more additional authentication attempts can include one or more of a facial recognition, a personal identification number (PIN), and authentication with a mobile device. For example, the fingerprint of the user can be received from an authentication device in communication with the multifunction printer. In addition, the mobile device can be, for example, after being unlocked, the mobile device can be held (i.e., "swiped) over a reader on the multifunction printer as an authentication attempt.

In accordance with an exemplary embodiment, the method can further include displaying, on the display panel of the multifunction printer, a third-party lock screen upon booting of the multifunction printer, the third-party lock screen appearing on the display panel of the multifunction printer as the first screen from the third-party workflow. In addition, a home screen from the third-party workflow can be displayed on the display panel of the multifunction printer. The home screen including one or more of a copy button or a scan button.

In accordance with an exemplary embodiment, the method can include detecting, with an authentication application on the multifunction printer, the first authentication attempt from the user; selecting, with the authentication application on the multifunction printer, the first authentication screen to be inserted into the third-party workflow; signaling, a multifunction printer/third-party party application framework switcher on the multifunction printer, to switch the display to the selected authentication screen; and switching, with the multifunction printer/third-party application framework switcher on the multifunction printer, to an insertion of authentication screens on the display panel of the multifunction printer from the third-party workflow on the multifunction printer. The multifunction printer/third-party application framework switcher, the authentication screens, and the authentication application can be hosted on firmware of the multifunction printer. In addition, the authentication data associated with the first authentication attempt can be sent from the authentication application on the multifunction printer to the authenticator server.

In accordance with an exemplary embodiment, the method can include returning control of the display panel on the multifunction printer to the third-party workflow upon a successful overall authentication of the user, and wherein the successful overall authentication of the user includes at least the successful authentication of the first authentication attempt of the user. In addition, after the returning control of the display panel on the multifunction printer to the third-party workflow screen, authentication information can be supplied to a third-party application on the multifunction printer that allows a next screen from the third-party workflow to be displayed on the display panel. For example, the next screen from the third-party workflow can be a third-party home page. In accordance with an exemplary embodiment, the third-party workflow can be is a custom workflow on the multifunction printer, the custom workflow including one or more custom screens for the multifunction printer.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for injecting screens into a third-party workflow on a display panel of a multifunction printer, the method comprising:

displaying, on the display panel of the multifunction printer, a first screen from a third-party workflow;

detecting, on the multifunction printer, a first authentication attempt from a user;

inserting, on the display panel of the multifunction printer, a first screen from an authentication workflow into the third-party workflow upon the detection of the first authentication attempt from the user;

sending, from the multifunction printer, authentication data associated with the first authentication attempt to an authentication server;

receiving, from the authentication server, an authentication result associated with the first authentication attempt; and displaying, on the display panel of the multifunction printer, a second screen from the third-party workflow following a successful authentication result from the authentication server of the first authentication attempt from the user.

2. The method according to claim 1, further comprising:

displaying, on the display panel of the multifunction printer, one or more authentication screens with a request for one or more additional authentication attempts from the user upon a successful authentication of the first authentication attempt from user;

sending, from the multifunction printer, authentication data associated with the one or more additional authentication attempts to the authentication server; and displaying, on the display panel of the multifunction printer, the second screen from the third-party workflow screen upon a successful authentication of the one or more additional authentication attempts from the user.

3. The method according to claim 2, wherein the first authentication attempt is a fingerprint of the user, and the one or more additional authentication attempts includes one or more of a facial recognition, a personal identification number (PIN), and authentication with a mobile device; and receiving the fingerprint of the user from an authentication device in communication with the multifunction printer.

4. The method according to claim 1, further comprising:

displaying, on the display panel of the multifunction printer, a third-party lock screen upon booting of the multifunction printer, the third-party lock screen appearing on the display panel of the multifunction printer as the first screen from the third-party workflow.

5. The method according to claim 1, further comprising:

displaying, on the display panel of the multifunction printer, a home screen from the third-party workflow, the home screen including one or more of a copy button or a scan button.

6. The method according to claim 1, further comprising:

detecting, with an authentication application on the multifunction printer, the first authentication attempt from the user;

selecting, with the authentication application on the multifunction printer, the first authentication screen to be inserted into the third-party workflow;

signaling, a multifunction printer/third-party party application framework switcher on the multifunction printer, to switch the display to the selected authentication screen; and switching, with the multifunction printer/third-party application framework switcher on the multifunction printer, to an insertion of authentication screens on the display panel of the multifunction printer from the third-party workflow on the multifunction printer.

7. The method according to claim 6, further comprising: hosting, on firmware of the multifunction printer, the multifunction printer/third-party application framework switcher, the authentication screens, and the authentication application.

8. The method according to claim 7, further comprising: sending, from the authentication application on the multifunction printer, the authentication data associated with the first authentication attempt to the authenticator server.

9. The method according to claim 1, further comprising: returning control of the display panel on the multifunction printer to the third-party workflow upon a successful overall authentication of the user, and wherein the successful overall authentication of the user includes at least the successful authentication of the first authentication attempt of the user.

10. The method according to claim 9, further comprising: after the returning control of the display panel on the multifunction printer to the third-party workflow screen, supplying authentication information to a third-party application on the multifunction printer that allows a next screen from the third-party workflow to be displayed on the display panel.

11. The method according to claim 10, wherein the next screen from the third-party workflow is a third-party home page.

12. The method according to claim 1, wherein the third-party workflow is a custom workflow on the multifunction printer, the custom workflow including one or more custom screens for the multifunction printer.

13. A non-transitory computer readable medium (CRM) storing computer program code executed by a computer processor that performs a process for injecting screens into a third-party workflow on a display panel of a multifunction printer, the processing comprising:
  displaying, on the display panel of the multifunction printer, a first screen from a third-party workflow;
  detecting, on the multifunction printer, a first authentication attempt from a user;
  inserting, on the display panel of the multifunction printer, a first screen from an authentication workflow into the third-party workflow upon the detection of the first authentication attempt from the user;
  sending, from the multifunction printer, authentication data associated with the first authentication attempt to an authentication server;
  receiving, from the authentication server, an authentication result associated with the first authentication attempt; and
  displaying, on the display panel of the multifunction printer, a second screen from the third-party workflow following a successful authentication result from the authentication server of the first authentication attempt from the user.

14. The non-transitory computer readable medium according to claim 13, further comprising:
  displaying, on the display panel of the multifunction printer, one or more authentication screens with a request for one or more additional authentication attempts from the user upon a successful authentication of the first authentication attempt from the user;
  sending, from the multifunction printer, authentication data associated with the one or more additional authentication attempts to the authentication server; and
  displaying, on the display panel of the multifunction printer, the second screen from the third-party workflow screen upon a successful authentication of the one or more additional authentication attempts from the user.

15. The non-transitory computer readable medium according to claim 13, further comprising:
  displaying, on the display panel of the multifunction printer, a third-party lock screen upon booting of the multifunction printer, the third-party lock screen appearing on the display panel of the multifunction printer as the first screen from the third-party workflow; and
  displaying, on the display panel of the multifunction printer, a home screen from the third-party workflow, the home screen including one or more of a copy button or a scan button.

16. The non-transitory computer readable medium according to claim 13, further comprising;
  detecting, with an authentication application on the multifunction printer, the first authentication attempt from the user;
  selecting, with the authentication application on the multifunction printer, the first authentication screen to be inserted into the third-party workflow;
  signaling, a multifunction printer/third-party party application framework switcher on the multifunction printer, to switch the display to the selected authentication screen; and
  switching, with the multifunction printer/third-party application framework switcher on the multifunction printer, to an insertion of authentication screens on the display panel of the multifunction printer from the third-party workflow on the multifunction printer.

17. A multifunction printer comprising:
  a display panel; and
  a processor, the processor configured to inject screens into a third-party workflow on the display panel of the multifunction printer by:
    displaying, on the display panel of the multifunction printer, a first screen from a third-party workflow;
    detecting, on the multifunction printer, a first authentication attempt from a user;
    inserting, on the display panel of the multifunction printer, a first screen from an authentication workflow into the third-party workflow upon the detection of the first authentication attempt from the user;
    sending, from the multifunction printer, authentication data associated with the first authentication attempt to an authentication server;
    receiving, from the authentication server, an authentication result associated with the first authentication attempt; and
    displaying, on the display panel of the multifunction printer, a second screen from the third-party workflow following a successful authentication result from the authentication server of the first authentication attempt from the user.

18. The multifunction printer according to claim 17, wherein the processor is further configured to:
  display, on the display panel of the multifunction printer, one or more authentication screens with a request for one or more additional authentication attempts from the user upon a successful authentication of the first authentication attempt from user;

send, from the multifunction printer, authentication data associated with the one or more additional authentication attempts to the authentication server; and display, on the display panel of the multifunction printer, the second screen from the third-party workflow screen upon a successful authentication of the one or more additional authentication attempts from the user.

19. The multifunction printer according to claim 17, wherein the processor is further configured to:

display, on the display panel of the multifunction printer, a third-party lock screen upon booting of the multifunction printer, the third-party lock screen appearing on the display panel of the multifunction printer as the first screen from the third-party workflow; and display, on the display panel of the multifunction printer, a home screen from the third-party workflow, the home screen including one or more of a copy button or a scan button.

20. The multifunction printer according to claim 17, wherein the processor is further configured to:

detect, with an authentication application on the multifunction printer, the first authentication attempt from the user;

select, with the authentication application on the multifunction printer, the first authentication screen to be inserted into the third-party workflow;

signal, a multifunction printer/third-party party application framework switcher on the multifunction printer, to switch the display to the selected authentication screen; and switch, with the multifunction printer/third-party application framework switcher on the multifunction printer, to an insertion of authentication screens on the display panel of the multifunction printer from the third-party workflow on the multifunction printer.

* * * * *